March 29, 1932.  B. BISCHOF  1,851,032

PACKING FOR ROTATING SHAFTS

Filed July 8, 1927

Bernhard Bischof
INVENTOR

By Otto Munk
his ATTY.

Patented Mar. 29, 1932

1,851,032

UNITED STATES PATENT OFFICE

BERNHARD BISCHOF, OF WINTERTHUR, SWITZERLAND

PACKING FOR ROTATING SHAFTS

Application filed July 8, 1927, Serial No. 204,224, and in Germany July 15, 1926.

The present invention relates to packing the rotating shafts of refrigerating machines, pumps and the like. Such shafts have heretofore been packed either by providing an elastic material about the rotating shaft, or by means of packing faces that move one against another being firmly connected some with the shaft and others with the housing. The first arrangement wears rapidly and soon becomes leaky, whilst the second cannot always be made with the required degree of accuracy, so that at high speeds leaks frequently occur and considerable heat is generated.

This invention has for its object to obviate these defects.

According to the invention two or more faces running one on another are used for packing the shaft, but the discs which provide the packing faces are not connected rigidly with the shaft or the housing but are attached to diaphragms. The latter permit the said faces to occupy a position which is most favourable for making a good joint with the smallest consumption of power. Any desired packing pressure can be used without hindering the free expansion of the shaft.

Two embodiments of the invention are diagrammatically illustrated by way of example in the accompanying drawings, wherein:—

Figure 1:
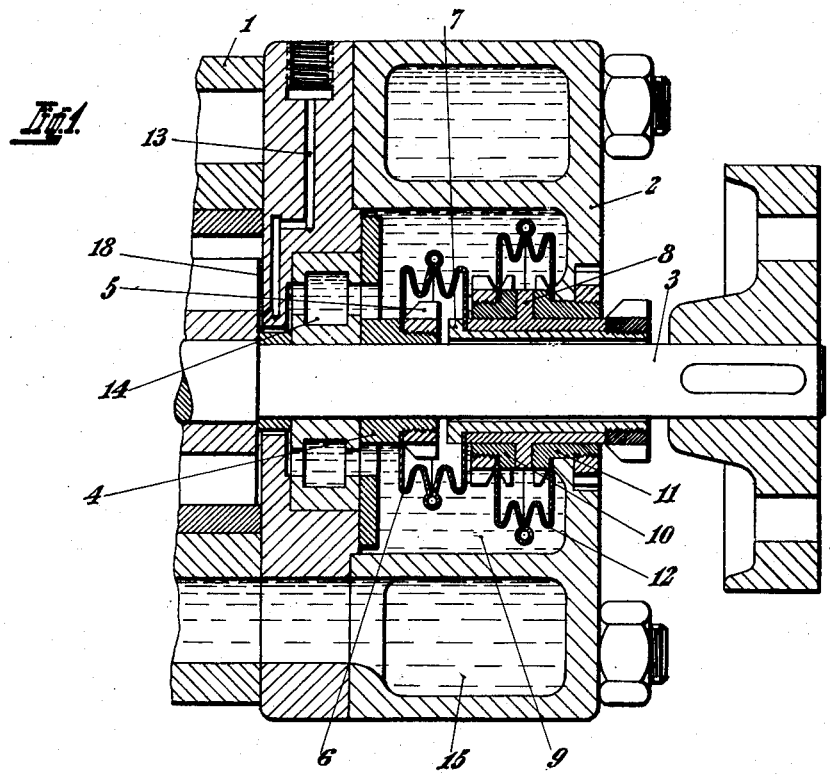
Figure 2:
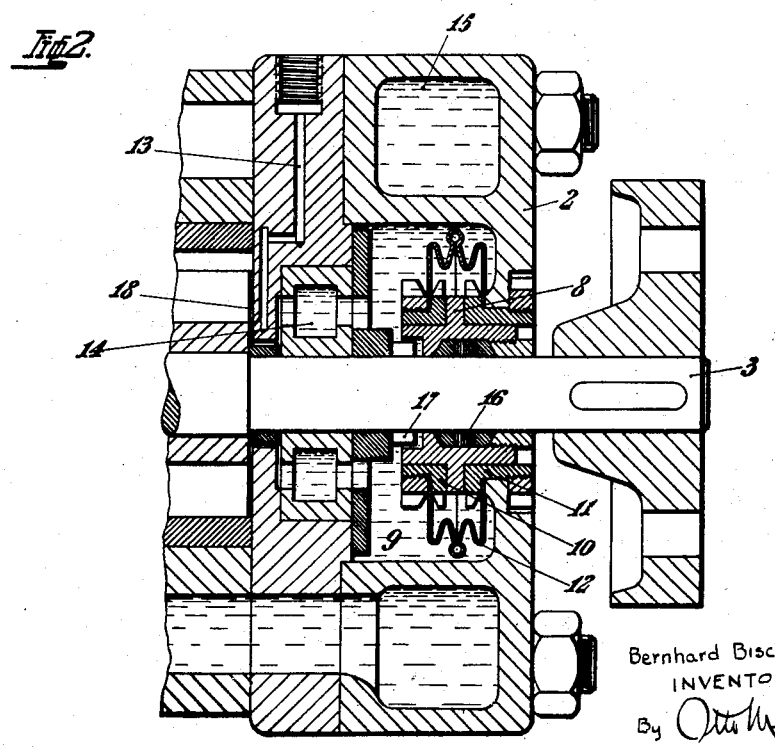

Figure 1 is a section of a device for packing the rotating shaft of a refrigerator compressor, and Figure 2 is a like view of a modified construction thereof.

Like reference numerals designate like parts in both views.

Referring first to Figure 1, 1 denotes a housing attached to a stationary stuffing box 2 by means of bolts, the box 2 accommodating a rotary shaft 3, which is fixed to a ring 4. One end of a diaphragm 6 is clamped to the ring 4 by means of a nut 5. The other end of the diaphragm 6 is clamped between bushings 7 and 8 which with the ring 4, diaphragm 6 and nut 5 rotate with the shaft 3, so that the gas or oil in the chamber 9 containing the diaphragm has no access to the inner side of the diaphragm 6 and the part of the shaft surrounded by the latter. The bushing 8 runs between two stationary rings 10 and 11, whereof the latter is fast in the box 2. The rubbing faces of the bushing 8 which make joint with the ends of the rings 10 and 11 are surrounded by a diaphragm 12 which is screwed fluid-tight on the rings 10 and 11. The diaphragms 6 and 12 are stamped out of thin sheet metal and are only so thick that they are not collapsed by the pressure existing in the chamber 9. They permit the shaft 3 to expand axially and also to make small movements transversely thereto without breaking the fluid-tight joints between the parts 8, 10 and 11.

The oil used for lubricating the jointing faces enters through a duct 13 in the box 2 into a small gap 18 formed between a shoulder on the shaft 3 and the stationary box 2, flows through a bearing 14 and enters the chamber 9 which it completely fills, so that the gas pressure in the machine presses on a liquid which can be packed better than a gas. The oil duct is preferably connected with the oil separator of the refrigerating machine or compressor in order to provide an endless path for the circulation of the oil. In order to obviate any rise of temperature the chamber 9 is water-cooled by a surrounding chamber 15. The oil use for lubricating the rubbing faces of the parts 10, 11 gradually fills the space contained in the diaphragm 12, so that the diaphragms are not only partly relieved, but the said rubbing faces run in an oil bath which ensures that when the machine is stationary even with a horizontal shaft, no gas can escape.

In the construction illustrated in Figure 2 the same principle is employed as described above with reference to Figure 1, but with the difference that the diaphragm 6 is replaced by a stuffing-box 16, built in the bushing 8. The packing material employed in this box 16 should be very soft in order to obviate all pressure on the bushing 8 which the latter could take up by its packing faces. The bushing 8 is driven by a driving member 17 fast on the shaft. In this arrangement also the oil chamber 9 is filled by way of the oil duct and is cooled by the chamber 15.

In the case of shafts which have to be packed against very high pressures two or more such systems can be connected in series, one behind another, in order to divide the pressure to be packed into two or more stages, the resulting superficial pressure being subdivided according to the number of systems connected in series.

The construction of the diaphragm is such that the pressures loading it on both sides negative one another, and only the pressure acting on the packing faces is left to press on them. If desired, the diaphragms may be given a small initial tension for causing them to bear better against the packing faces.

I claim:—

1. In a packing device, the combination of a rotary shaft, a bushing thereon, two packing rings having joint faces with the bushing, a stationary diaphragm enclosing the joint faces of said rings, and a second diaphragm which encloses the joint between said bushing and said shaft and yieldingly connects said bushing with the shaft.

2. In a packing device, the combination of a rotary shaft, a bushing free to rotate therewith, two packing rings having joint faces with the bushing, a stationary diaphragm enclosing the jointing faces of said rings, and a stuffing-box for packing said bushing on the shaft, which stuffing-box is situated in said bushing and comprises soft packing material.

3. In a packing device, the combination with a rotary shaft, and a plurality of packing faces surrounding the same and making a rubbing joint one with another, of a stationary diaphragm arranged to enclose a pair of said packing faces fluid-tight, an oil bath chamber formed by the diaphragm and enclosing said packing faces, and means for supplying said oil bath chamber with oil from a circulatory system.

4. In a packing device, the combination of a rotary shaft, a plurality of packing faces surrounding the same and making rubbing contact one with another, a stationary diaphragm arranged to enclose a pair of said packing faces fluid-tight, which diaphragm forms an oil chamber for an oil bath for the packing faces enclosed by it, and a cooling chamber surrounding said oil bath.

5. In a packing device, the combination of a rotary shaft, a plurality of packing faces surrounding the same and making rubbing contact one with another, a housing forming an oil bath chamber surrounding said packing faces, a collapsible stationary diaphragm situated in said oil bath chamber and enclosing a pair of said packing faces, which diaphragm is filled with oil and constitutes an oil bath for the packing faces enclosed by it said diaphragm being capable of maintaining a balanced fluid pressure on both sides thereof.

Signed at Zurich, Switzerland, this 22nd day of June, 1927.

BERNHARD BISCHOF.